US 8,757,217 B2
Jun. 24, 2014

(12) United States Patent
Maguire

(10) Patent No.: US 8,757,217 B2
(45) Date of Patent: Jun. 24, 2014

(54) METHODS FOR GRAVIMETRICALLY METERING LIQUID COLOR

(76) Inventor: Stephen B. Maguire, Glen Mills, PA (US)

(*) Notice: Subject to any disclaimer, the term of this patent is extended or adjusted under 35 U.S.C. 154(b) by 0 days.

(21) Appl. No.: 13/110,391

(22) Filed: May 18, 2011

(65) Prior Publication Data

US 2012/0260992 A1  Oct. 18, 2012

Related U.S. Application Data

(63) Continuation of application No. 11/454,625, filed on Jun. 16, 2006, now Pat. No. 7,958,915.

(51) Int. Cl.
*B65B 1/04* (2006.01)
*G01G 13/00* (2006.01)
*G01G 11/08* (2006.01)

(52) U.S. Cl.
CPC ............... *G01G 11/08* (2013.01); *G01G 13/00* (2013.01)
USPC ...................... 141/2; 141/83; 177/64; 177/66

(58) Field of Classification Search
CPC ........... G01G 11/08; G01G 13/00; B65B 1/04
USPC .................. 141/2, 83, 94, 100–105; 366/141; 177/64, 66, 73, 81
See application file for complete search history.

(56) References Cited

U.S. PATENT DOCUMENTS

| | | |
|---|---|---|
| 600,233 A | 3/1898 | Palm |
| 1,451,759 A | 4/1923 | Bruhn |
| 1,489,348 A | 4/1924 | Hampton |
| 2,188,646 A | 1/1940 | Bunch |
| 2,199,657 A | 5/1940 | Bunch |
| 2,387,233 A | 10/1945 | Clapp |
| 2,606,696 A | 8/1952 | Miner |
| 2,656,828 A | 10/1953 | Conover |
| 2,665,825 A | 1/1954 | Poitras et al. |

(Continued)

FOREIGN PATENT DOCUMENTS

| | | |
|---|---|---|
| DE | 3433693 A1 | 3/1986 |
| FR | 1 477 595 A | 4/1967 |
| GB | 1145752 | 3/1969 |
| WO | WO 01/49374 A1 | 7/2001 |

OTHER PUBLICATIONS

Thirty-six page catalog entitled "Maguire Color Blending Equipment" published by Maguire Products, Inc., 1993, United States.

(Continued)

*Primary Examiner* — Timothy L Maust
(74) *Attorney, Agent, or Firm* — Charles N. Quinn; Fox Rothschild LLP

(57) ABSTRACT

A method for delivering liquid color directly into the screw barrel of a plastic resin process machine including weighing a container of liquid color; pumping liquid color from the container into the plastic resin process machine screw barrel; and continuously comparing actual readings from the scale to expected readings based on a desired predetermined liquid color usage rate and continuously regulating speed of pumping in response to such comparison to supply liquid color directly into the to the plastic resin process machine screw barrel according to a selected recipe of resin material to produce plastic parts having desired color characteristics.

4 Claims, 3 Drawing Sheets

(56) References Cited

U.S. PATENT DOCUMENTS

| | | | |
|---|---|---|---|
| 2,701,881 A | 2/1955 | McGee | |
| 2,873,892 A | 2/1959 | Nelson et al. | |
| 2,909,315 A | 10/1959 | Sampietro | |
| 3,391,645 A | 7/1968 | Koza | |
| 3,518,033 A | 6/1970 | Anderson | |
| 3,785,412 A * | 1/1974 | Stone | 141/83 |
| 3,814,388 A | 6/1974 | Jakob | |
| 3,883,275 A | 5/1975 | Browne | |
| 3,957,399 A | 5/1976 | Siczek | |
| 3,988,088 A | 10/1976 | King et al. | |
| 3,998,103 A | 12/1976 | Bjorklund et al. | |
| 4,185,948 A | 1/1980 | Maguire | |
| 4,473,173 A | 9/1984 | DeGroff et al. | |
| 4,501,405 A | 2/1985 | Usry | |
| 4,571,416 A | 2/1986 | Jarzombek et al. | |
| 4,586,882 A | 5/1986 | Tseng | |
| 4,605,297 A * | 8/1986 | Livingston et al. | 396/582 |
| 4,606,710 A | 8/1986 | Maguire | |
| 4,621,990 A | 11/1986 | Forsythe et al. | |
| 4,657,490 A | 4/1987 | Abbott | |
| 4,967,940 A | 11/1990 | Blette et al. | |
| 5,039,279 A | 8/1991 | Natwick et al. | |
| 5,199,852 A | 4/1993 | Danby | |
| 5,215,215 A | 6/1993 | Sauer | |
| 5,225,210 A | 7/1993 | Shimoda | |
| 5,344,232 A | 9/1994 | Nelson et al. | |
| 5,364,242 A | 11/1994 | Olsen | |
| 5,853,244 A * | 12/1998 | Hoff et al. | 366/141 |
| 5,953,923 A * | 9/1999 | Davies | 62/50.1 |
| 5,980,490 A | 11/1999 | Tsoukalis | |
| 5,988,983 A | 11/1999 | Furusawa | |
| 6,007,236 A | 12/1999 | Maguire | |
| 6,057,514 A | 5/2000 | Maguire | |
| 6,188,936 B1 * | 2/2001 | Maguire et al. | 700/265 |
| 6,213,739 B1 | 4/2001 | Phallen et al. | |
| 6,386,841 B1 | 5/2002 | Probst | |
| 6,402,363 B1 | 6/2002 | Maguire | |
| 6,502,013 B1 * | 12/2002 | Sosnik | 700/240 |
| 6,599,005 B2 | 7/2003 | van Der Wei | |
| 6,719,453 B2 * | 4/2004 | Cosman et al. | 366/141 |
| 6,880,965 B1 | 4/2005 | Sheffield, Jr. | |
| 6,991,004 B2 * | 1/2006 | Kaufhold et al. | 141/83 |
| 7,118,349 B2 | 10/2006 | Oglesby | |
| 7,154,069 B1 | 12/2006 | Gordon | |
| 2002/0023449 A1 | 2/2002 | Park et al. | |
| 2002/0031822 A1 | 3/2002 | Van Der Wei et al. | |
| 2003/0142580 A1 | 7/2003 | Maguire | |
| 2003/0218014 A1 | 11/2003 | Gregory et al. | |
| 2005/0052945 A1 | 3/2005 | Maguire | |
| 2006/0067844 A1 | 3/2006 | Iversen | |
| 2007/0071624 A1 | 3/2007 | Brewer | |

OTHER PUBLICATIONS

Forty-four page two-sided brochure including cover and back pages entitled "Maguire: Auxiliary equipment for the plastics industry" of Maguire Products, Inc., Oct. 2000.

Two-sided color brochure entitled Maguire: Model MPA Liquid Color Pump , Maguire Products, Inc., published Dec. 28, 1995.

International Search Report for PCT/US02/02934, dated Feb. 20, 2003.

Written Opinion for PCT/US02/02934, dated Mar. 24, 2003.

International Search Report for PCT/US11/021994, dated May 24, 2011.

Written Opinion for PCT/US11/021994, dated May 24, 2011.

* cited by examiner

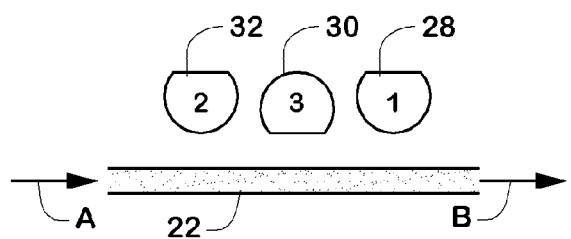
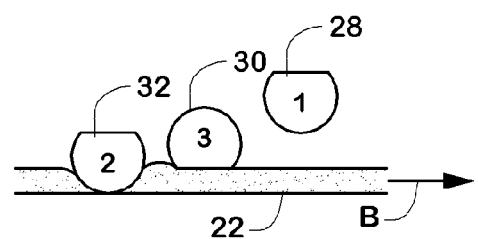
FIG. 4A                FIG. 4D
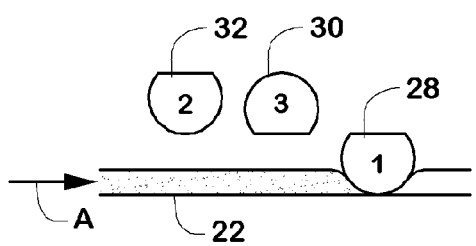
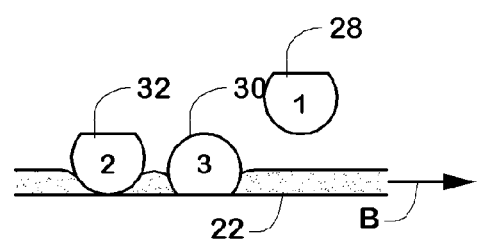
FIG. 4B                FIG. 4E
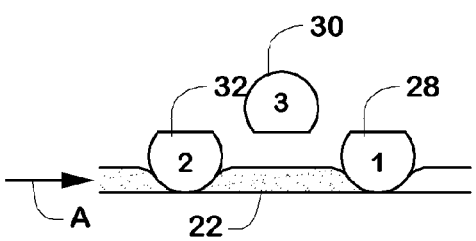
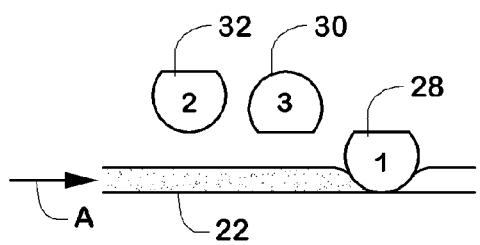
FIG. 4C                FIG. 4F

METHODS FOR GRAVIMETRICALLY METERING LIQUID COLOR

CROSS REFERENCE TO RELATED PATENT APPLICATION

This patent application is filed under 35 USC 120 as a continuation and claiming the benefit of the priority of U.S. Ser. No. 11/454,625, filed on 16 Jun. 2006, now U.S. Pat. No. 7,958,915, entitled "Liquid Color Gravimetric Metering Apparatus and Methods," issued 14 Jun. 2011 in the name of Stephen B. Maguire, the entire disclosure of which is hereby incorporated herein by reference.

This patent application discloses subject matter in common with U.S. patent application Ser. No. 11/455,003, filed 16 Jun. 2006, now abandoned, titled "Multiple Pusher Liquid Color Pump", submitted in the name of Stephen B. Maguire.

BACKGROUND OF THE INVENTION

1. Field of the Invention

This invention relates generally to processing of plastic resin material in the course of fabrication, by molding or extrusion, into finished colored plastic parts, and more particularly to methods and apparatus for processing liquid color material used to impart a desired color to the finished plastic parts.

2. Description of the Prior Art

Color is imparted to finished plastic parts by adding a coloring agent, either liquid color material or solid color pellets, to plastic resin material as it is being fabricated into finished plastic parts. The liquid color or the colored pellets control the color of the finished plastic parts. Depending on whether liquid color or solid colored pellets are used, the position at which the coloring agent is added to the plastic resin material during the part fabrication process may change.

Colored solid pellets are easy to handle and do not create a mess in the event of spillage. This is not the case with liquid color. Liquid color is difficult to handle and, in the event of a spill, creates a serious clean-up problem with a threat of a safety hazard, since liquid color material spilling on a factory floor, which is typically smooth concrete, creates a very slippery surface.

Coloring agents for plastic parts, whether the agents be solid colored pellets or liquid color, are expensive. Coloring agents are never underused since underusage results in a defective, undercolored part. Overuse of a coloring agent does not alter the color of a fabricated finished plastic part. Instead, overuse of a coloring agent results in much the same effect as painting a wall multiple times with the same paint—it does not change the color of the wall. Accordingly, some overuse of the coloring agent is almost always the case. However, overuse is to be avoided since overuse means waste of the coloring agent, with consequent costs that need not be incurred in fabricating the plastic parts of interest.

Liquid color, with the attendant potential for problems in the event of a leak or spillage of the liquid color material, is currently typically added at the throat of an extrusion process or directly into an end of a barrel of a molding machine. If liquid color is added further upstream, for example into the weigh bin of a gravimetric blender as disclosed in U.S. Pat. No. 6,007,236, there is risk of liquid color contamination of the blender parts, which may interfere with blender operation. Additionally, introducing liquid color to the process by adding the liquid color into the blender weigh bin runs the risk of incurring color changeover issues. These problems have, to some extent, restricted use of liquid color in the plastic molding and extrusion.

Liquid color diaphragm pumping apparatus for use in the plastic molding and extrusion is disclosed in published U.S. patent application Ser. No. 10/066,338, filed 31 Jan. 2002 and published as United States patent publication 2003-0142580, and in pending U.S. patent application Ser. No. 10/856,422, filed 28 May 2004 and published as United States patent publication 2005-0052945.

Lost of weight or "gravimetric" control has previously been used in processing solid color pellets furnished to plastic resin process equipment using auger feeders. However, gravimetric control has not heretofore been used with liquid color and associated liquid color pumps.

SUMMARY OF THE INVENTION

This invention in its most pristine form involves use of a scale with a drum or pail of liquid color on the scale, with the scale sensing the weight of the drum or pail of liquid color, and thereafter controlling a pump according to the weight sensed by the scale, to run the pump faster or slower in order to maintain a desired rate of liquid color delivery to a process machine, namely an extruder or a molding press, based on feedback information received from the scale. This is a "loss of weight" or "gravimetric" approach to supplying liquid color to a plastic molding press or extruder.

The controller detects the loss of weight by the drum or pail as liquid color is removed, and compares actual weight readings with expected weight readings based on a desired usage rate for the liquid color. Once the comparison is performed, the controller adjusts the pump speed accordingly to supply, preferably continuously, the desired amount of liquid color material to the plastic resin process machine, namely a molding press or an extruder. Desirably, the liquid color material may be added at the throat of the extruder or directly into the end of the barrel of the molding press in the conventional manner.

Alternatively, the liquid color may be injected directly into either an extruder screw barrel or a molding press reciprocating screw barrel, at a position downstream from the barrel throat, closer to where the finished plastic parts are fabricated. This approach may be accomplished by using the methods and apparatus disclosed in U.S. patent application Ser. No. 11/455,002, published as U.S. Patent Publication 07/029290 on 20 Dec. 2007, now U.S. Pat. No. 7,980,834 entitled "Liquid Color Injection Pressure Booster Pump and Pumping Methods".

Whichever approach is taken for supplying liquid color to a resin process machine, this invention results in higher accuracy and tighter control over use of liquid color, with resulting significant savings in liquid color costs, which in a large plant can run into millions of dollars. Since liquid color usage and the process for control thereof are based on actual weight of liquid color consumed, this provides certainty, on a day-in and day-out basis, that the color usage rate is correct for a given part being molded or extruded.

Accordingly, in one of its aspects this invention provides apparatus for delivering liquid color to a plastic resin process machine where the apparatus includes a scale for continuously supporting and weighing a container of liquid color. The apparatus further includes a pump for removing liquid color from the container, with the pump desirably includes a housing, a plurality of pushers within the housing, preferably positioned side-by-side respecting one another, a compressible tube for transporting liquid color from the container to the process machine, with the tubing being insertable into the housing at a position at which each of the pushers when displaced squeezes the tube, and with the side-by-side positioning of the pushers resulting in the pushers serially contacting the tube when displaced.

The apparatus further includes a controller for repeatedly actuating the pushers in sequence whereby a first pusher is displaced to squeeze the tube substantially closed while the second and third pushers are not displaced, thereby permitting liquid color to flow through the tube from the supply to a first position of tube closure. A second pusher is then displaced to squeeze the tube substantially closed and trap liquid color in the tube between the first position of tube closure and a second position of tube closure. The first pusher is permitted to return to its undisplaced position thereby permitting liquid color to flow through the tube past the first position of tube closure, and a third pusher is displaced to squeeze the tube and thereby force at least a portion of the trapped liquid color through the tube past the first position of tube closure, thereby to supply liquid color to a plastic resin process machine at a predetermined rate, according to a selected recipe, to produce plastic parts having desired color characteristics. The controller senses weight of the container as received from the scale.

In yet another of its aspects this invention provides apparatus for delivering liquid color to a plastic resin material processing machine where the apparatus includes a scale for weighing a container of liquid color, a pump for removing liquid color from the container, with the pump including a housing, a plurality of pushers within the housing, and a compressible tube for transporting liquid color from the container to the process machine through the pump; with the tube being positioned in the housing so that each of the pushers, when displaced, squeezes the tube with the positioning of the pushers resulting in the pushers, when displaced, generally serially contacting the tube.

The invention in this aspect further includes a controller for repeatedly actuating the pushers whereby a first pusher is displaced to squeeze the tube while second and third pushers are not squeezing the tube, thereby permitting liquid color to flow through the tube from the supply to a first position of tube squeezing. After this, the second pusher is displaced to squeeze substantially trapped liquid color in the tube between the first and second positions of tube squeezing. The first pusher is then relaxed to a non-squeezing position, permitting liquid color to flow through the tube, past the first position of tube squeezing, and the third pusher is displaced to squeeze the tube and thereby substantially force at least a portion of the trapped liquid color through the tube, past the first position of tube squeezing, to supply liquid color to a plastic resin process machine at a predetermined rate according to a selected recipe to produce plastic parts having desired color characteristics, based on sensed container weight from the scale.

In yet another of its aspects this invention provides a method for supplying liquid color to a plastic resin material process machine where the method includes weighing a container of liquid color and transporting liquid color from the container to the plastic resin material process machine responsively to changes in weight of the container. In this method aspect of the invention, weighing the container preferably further includes continuously supporting the container. The weighing is preferably performed continuously.

In yet another aspect of the invention there is provided apparatus for delivering liquid color to a plastic resin process machine where the apparatus includes a scale for weighing a container of liquid color, a pump for removing liquid color from the container and supplying the liquid color to the plastic resin process machine, and a controller for regulating the pump to supply liquid color to the plastic resin material process machine at a predetermined rate, according to a selected recipe, to produce colored plastic parts having desired characteristics in response to changes of sensed weight of the container determined by the scale. In this apparatus aspect of the invention the scale preferably continuously weighs the container; furthermore, the scale preferably supports the container and further preferably does so in a continuous manner.

BRIEF DESCRIPTION OF THE DRAWINGS

FIGS. 4A through 4F are schematic depictions of three pushers forming portions of the pump, which pushers are illustrated in FIGS. 2 and 3.

FIG. 4A depicts the pushers at an initial position at which all three pushers are retracted and are ready to begin one cycle of pusher movement for pumping liquid color.

FIG. 4B depicts the pushers at positions at which a first pusher has advanced to squeeze the liquid color delivery tube closed while the second and third pushers have not been displaced, thereby permitting liquid color to flow through a squeezable tube from the supply to a first position of tube closure.

FIG. 4C depicts the pushers at positions with a second pusher having additionally been displaced to squeeze the liquid color supply tube closed and thereby trap liquid color in the tube between the first position of tube closure defined by the first pusher and a second position of tube closure defined by the second pusher.

FIG. 4D depicts the pushers at positions at which the first pusher has retracted, the second pusher remains in place to keep the liquid color supply closed at the second position of tube closure and a third center pusher has been displaced to squeeze the liquid color supply tube and thereby forcedly squeeze some of the trapped liquid color through the tube past the first position of tube closure thereby supplying liquid color to a plastic resin processing machine.

FIG. 4E depicts the pushers at positions at which the second pusher remains displaced to continue squeezing the liquid color supply tube closed while the third pusher has completed travel towards the liquid color supply tube thereby completing squeezing of the liquid color supply tube and forcing substantially all of the liquid color, which had been trapped within the liquid color supply tube downstream of the seal position of tube closure, out of the liquid color tube towards a plastic resin processing machine for consumption of the liquid color.

FIG. 4F depicts the pushers at positions at which the second and third pushers have retracted, the first pusher has advanced to squeeze the liquid color supply tube closed at the first position of tube closure, thereby permitting liquid color to flow into the tube from the supply to the first position of tube closure, whereupon the cycle of pusher movement for supplying liquid color through the liquid color supply tube to a plastic resin process machine may repeat.

DESCRIPTION OF THE PREFERRED EMBODIMENTS AND BEST MODE KNOWN FOR PRACTICE OF THE INVENTION

Figure 1:
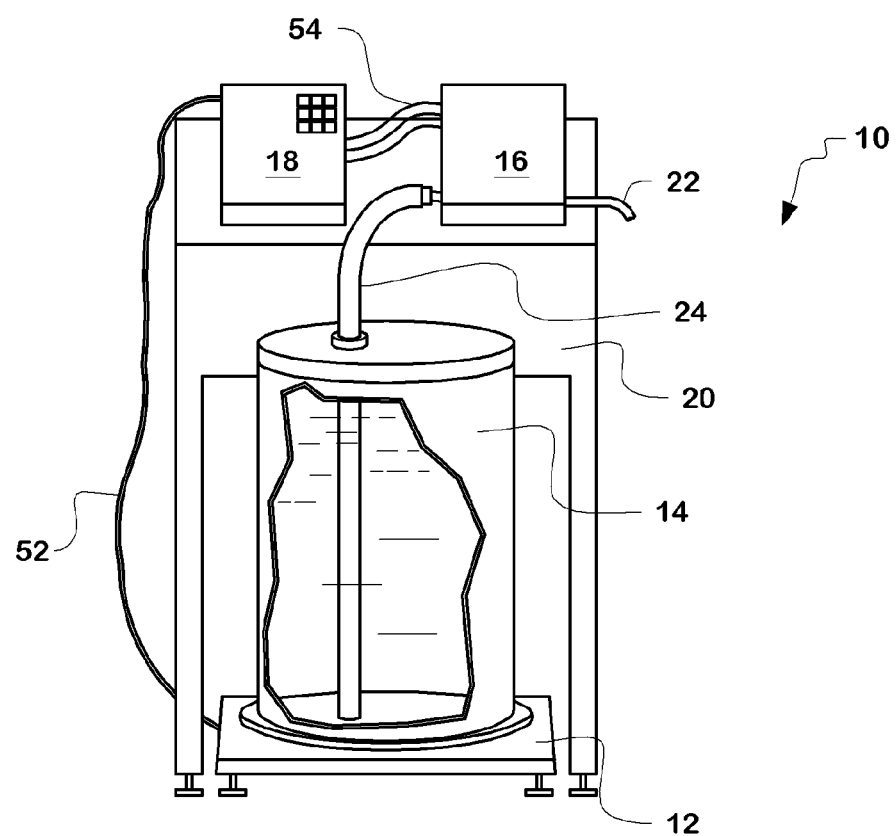
FIG. 1 is a front elevation of liquid color gravimetric metering apparatus in accordance with the invention, with a container of liquid color depicted partially broken away to illustrate liquid color contained therewithin.

Referring to the drawings in general and to FIG. 1 in particular, apparatus for delivering liquid color to a process machine is designated generally 10. Apparatus 10 includes a scale, designated generally 12, a container of liquid color where the container is designated generally 14, a pump, which is preferably a triple pusher pump and is designated generally 16, and a controller designated generally 18, with container 14, pump 16, and controller 18 all being supported by a stand designated generally 20.

A liquid color supply line 22 leads from the interior of container 14 to supply liquid color to triple pusher pump 16 at the inlet thereto, which has not been numbered in the drawings to enhance drawing clarity. Liquid color furnished by triple pusher pump 16 exits triple pusher pump 16 via liquid color supply line 24, which preferably leads directly to a resin material process machine such as an extruder or an injection molding press.

As further illustrated in FIG. 1, container 18 desirably has a lid 26. If desired, container 18 may be of the type disclosed in published U.S. patent applications 2003-0142580 and 2005-0052945 whereby a diaphragm pump is within container 14, at the bottom thereof, thereby to furnish liquid color from container 14 at a very moderate pressure for input to triple pusher pump 16.

A signal line 52 carries a signal indicative of the sensed weight of container 14 and any liquid color therewithin, as determined by scale 12, to controller 18. Controller 18 includes push buttons 54 for programming controller 18 so as to operate triple pusher pump 16 and to furnish the desired amount of liquid color via liquid color supply line 22 to a process machine of interest according to the recipe for material for fabrication of the finished plastic parts of interest. Output lines 54, only one of which has been numbered in FIG. 1, but three of which connect controller 18 to triple pusher pump 16, provide electrical signals from controller 18 to solenoid actuated air valves within triple pusher pump 16, to control operation of triple pusher pump 16 and furnish liquid color via liquid color supply line 22 at the preselected rate.

Figure 2:
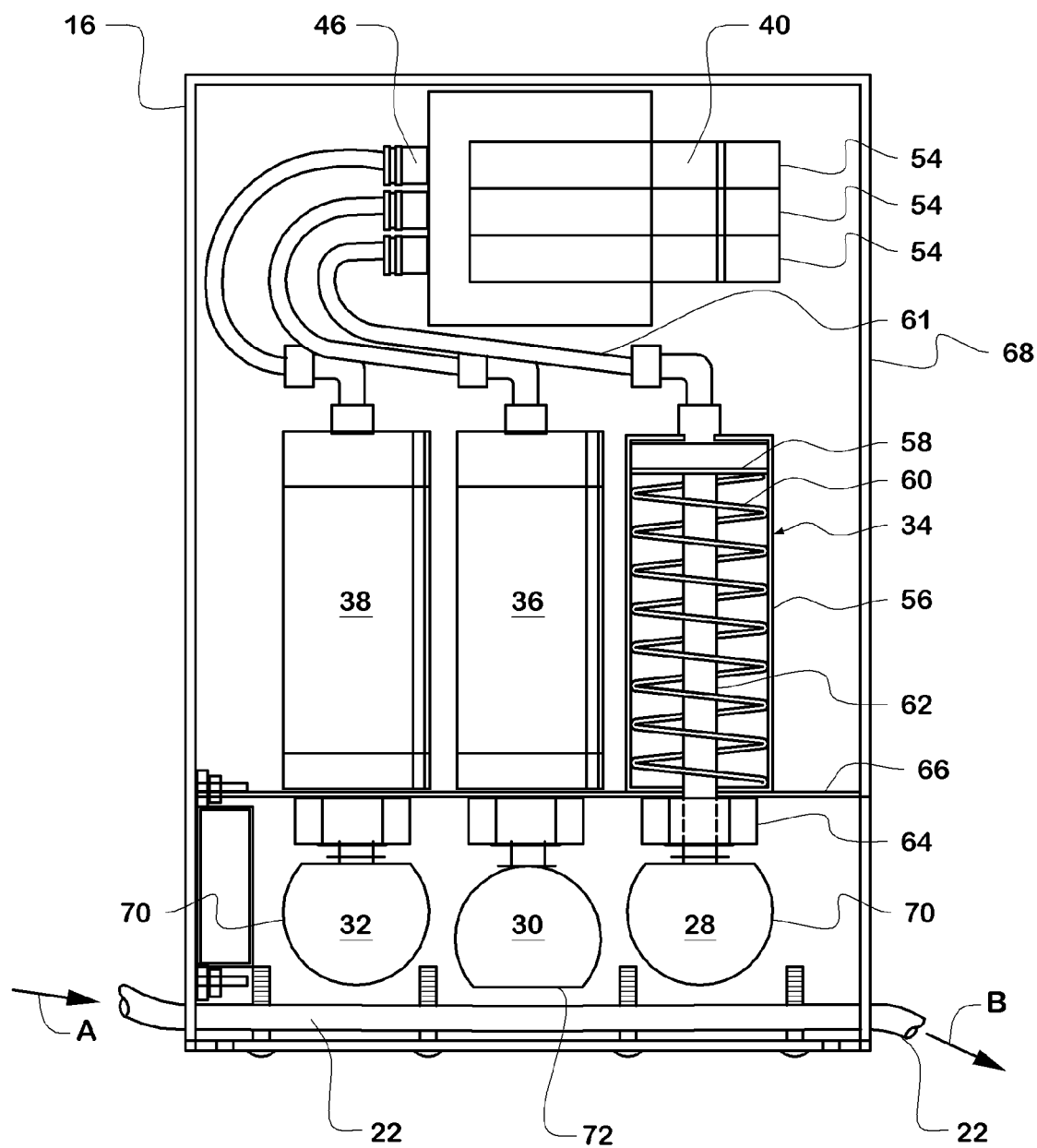
FIG. 2 is a front elevation of a multiple pusher liquid color pump for use as a part of the liquid color gravimetric metering apparatus of this invention and for use in practicing certain of the method aspects of this invention, where the front cover of the pump has been removed to reveal interior details.

Referring to FIG. 2 where triple pusher pump 16 is illustrated with the front panel of the pump housing removed in order that the interior components of triple pusher pump 16 may be viewed, pusher pump 16 includes three pushers, designated 28, 30, 32 respectively. Pushers 28, 30, 32 act against and squeeze liquid color supply line 22 in an ordered sequence thereby to control flow of liquid color through supply line 22 and to pump liquid color to a plastic resin process machine such as an extruder or an injection molding press via liquid color supply line 22. Each of first, second and third pushers 28, 30, 32 is connected to and actuated by a piston-cylinder combination, where first, second and third piston-cylinder combinations have been designated 34, 36, 38 respectively as being associated with first, second and third pushers 28, 30 and 32.

First piston-cylinder combination 34 has been shown with the exterior of the cylinder portion of the combination cut away to reveal the inner workings of piston-cylinder combination 34. As visible in FIG. 2, piston-cylinder combination 34 includes a cylinder designated 56 and a piston 58, where piston 58 is in a form of a relatively flat plate.

Piston cylinder combination 34 further includes a piston return spring 60, which is preferably of spiral configuration and slidably contacts the curved interior of cylinder 56, serving to return piston 58 to a vertically extreme upwards position when pressurized air is not furnished to piston-cylinder combination 34.

A first solenoid designated generally 40 actuates a first air valve designated generally 46 to supply compressed air via a line 61 to first piston-cylinder combination 34, thereby to push piston 58 downwardly. Fixed to piston 58 is a connecting rod 62 to which first pusher 28 is affixed, at the end of connecting rod 62 remote from piston 58. First, second and third piston-cylinder combinations 34, 36, 38 rest on plate 66 and are retained in position thereon by suitable nut and bushing combinations, one of which is designated 64 in FIG. 2. Connecting rod 62 passes slidably within nut-bushing combination 64 as connecting rod 62 reciprocates responsively to downward force resulting when air is applied to the upper side of piston 58 and, once that air pressure is relaxed, when return spring 60 urges piston 58 upwardly into the position in the position illustrated in FIG. 2.

Figure 3:
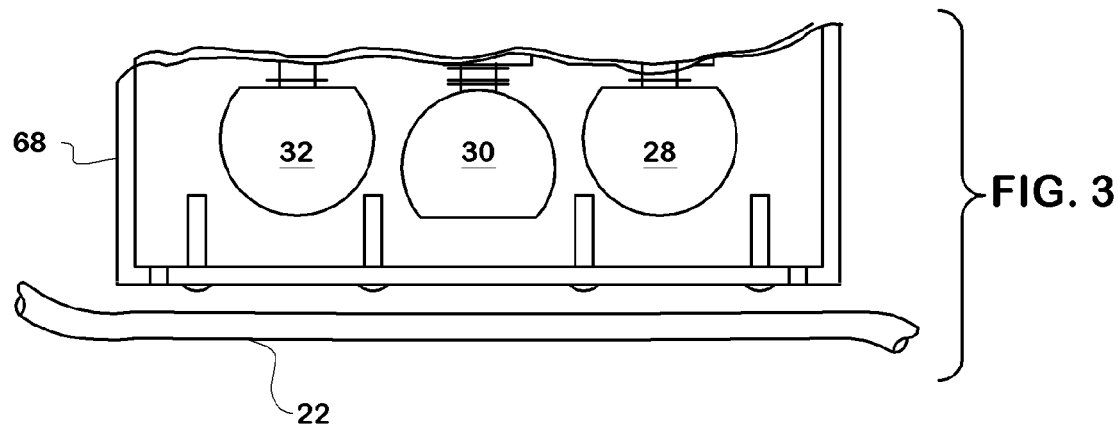
FIG. 3 is a broken front elevation of the lower portion of the pump illustrated in FIG. 2, with a liquid color delivery tube shown outside the pump housing and with some of the internal components of the pump illustrated in a different position.

In comparing FIG. 2 with FIG. 3 it is evident that liquid color supply line 22 may be removed from housing 68 in which pump 16 is enclosed. Such positioning of liquid color supply line 22 outside of housing 68 is illustrated in FIG. 3.

Controller 18 is programmable so as to permit any desired sequence, within any reasonable range of speed, of operation of piston-cylinder combinations 34, 36, 38 thereby to permit any desired sequence of squeezing or unsqueezing of liquid color supply line 22 when positioned within housing 68 in the general manner illustrated in FIG. 2.

First and third pushers 28, 32 have outer peripheries that are curved, and would appear as cylinders if viewed from the side in FIGS. 2 and 3, facing towards liquid color supply line 22. These curved outer peripheries are designated 70 in FIGS. 2 and 3. The curved outer peripheries 70 of pushers 28, 32 facilitates pushers 28 and 32 operating as off-on valves as respecting flow of liquid color through liquid color supply line 22. Specifically, curved peripheries 70 permit pushers 28, 32 to act as off-on valves defining first and second positions of tube closure, with a first position of tube closure being directly beneath pusher 28 and the second position of tube closure being directly beneath pusher 32. The curvature of surfaces 70, contacting liquid color supply tube 22 when pushers 28 and 32 are positioned against tube 22 and have squeezed tube 22 closed, means tube 22 is closed only over a very short length, immediately beneath pushers 28 and 32, when either of those pushers are actuated by their associated piston-cylinder combination 34 or 38.

Contrasting, third pusher 30 has a surface 72 facing liquid color supply tube 22 that is flat. Surface 72, being flat, results in liquid color within the portion of tube 22 directly beneath pusher 30 and along the entire length of surface 72 running parallel to liquid color supply line 22, being pushed out of liquid color supply line 22 when third pusher 30 is actuated by associated piston-cylinder combination 36 and pusher 30 squeezes liquid color supply line 22 completely closed, thereby forcing all liquid color material within liquid color supply line 22 beneath the projected area of pusher 30 towards the outlet of liquid color supply line in the direction indicated by arrow B in FIG. 2. Actuation of a given solenoid such as solenoid 40 by controller 18, via a signal sent to solenoid 40 through line 54, opens valve 46 thereby allowing pressurized air from a remote source, which is furnished to valve 16 but not shown in the drawings, to be applied to the upper surface of piston 58 thereby actuating, for example, pusher 28 and forcing pusher 28 against liquid color supply line 22 thereby to close liquid color supply line 22 at a position at first tube closure.

FIGS. 4A through 4F depict one desired and preferred sequence of operation of pushers 28, 32, 30 to pump liquid color through liquid color supply line 22.

In FIG. 4A pushers 28, 30, 32 are all at an initial position, at which all three pushers 28, 32, 30 are retracted and are ready to begin one cycle of pusher movement for pumping liquid color through liquid color supply line 22. Arrow A denotes liquid color entering liquid color supply line 22 and Arrow B denotes liquid color exiting liquid color supply line 22 after passing the position of pushers 28, 32, 30.

Referring to FIG. 4B, first pusher 28 has advanced to squeeze liquid color supply line 22 closed at a position of first tube closure while second pusher 32 and third pusher 30 have not been displaced. Accordingly, liquid color continues to flow into liquid color supply line 22 from a supply of liquid color as indicated by Arrow A, but the liquid color cannot flow past the first position of tube closure defined by the intersection of first pusher 28 with liquid color supply line 22, since first pusher 28 has squeezed liquid color supply line 22 closed.

Next, as illustrated in FIG. 4C, second pusher 32 has been displaced to squeeze liquid color supply line 22 closed thereby to define a position of second tube closure, and thereby has trapped liquid color in the segment of liquid color supply line 22 between the first and second positions of tube closure as defined by first pusher 28 and second pusher 32 having squeezed liquid color supply line 22 closed at the positions shown. Such squeezing and resulting closure of liquid color supply line 22 traps a portion of liquid color between the two positions of liquid color supply line closure, as illustrated in FIG. 4C, between pushers 28 and 32.

Next, first pusher 28 is retracted by release of the air pressure through deactuation of the associated solenoid 40 and action of return spring 60 pushing piston 58 in cylinder 56 upwardly, thereby raising first pusher 28 away from and out of contact with liquid color supply line 22, as illustrated in FIG. 4D. At the same time, third pusher 30 is actuated, begins to travel downwardly, and encounters liquid color supply line 22 as illustrated in FIG. 4D. This encounter begins to compress liquid color supply line 22 as illustrated in FIG. 4D thereby beginning to push liquid color out of that segment of liquid color supply line 22 in the direction indicated by Arrow B in FIG. 4D. This liquid color can only move in the direction of Arrow B in FIG. 4D due to the continued presence of second pusher 32 in the position illustrated in FIG. 4D whereby second pusher 32 has closed liquid color supply line 22 at the position of second tube closure. Therefore, there is only one direction that liquid color can travel in response to the tube being squeezed by third pusher 30.

As depicted in FIG. 4E, third pusher 30 continues its downward travel, continuing to squeeze liquid color supply line 22 more and more closed, thereby continuing to force liquid color that was within liquid color supply line 22 below the umbrella of third pusher 30, out of liquid color supply line 22, in the direction indicated by Arrow B in FIG. 4E. As was the case illustrated in FIG. 4D, continued presence of second pusher 32 squeezing liquid color supply line 22 closed as illustrated in FIG. 4E results in liquid color within liquid color supply line 22 being able to move only in a single direction, indicated in Arrow B in FIG. 4E.

Once third pusher 30 has completed squeezing the liquid color that is within tube 22 below the umbrella of pusher 30, first pusher 28 is actuated thereby closing liquid color supply tube 22 at a position of first tube closure, where first pusher 28 has squeezed liquid color supply tube closed, thereby preventing passage thereby of any liquid color. Second pusher 32 and third pusher 30 have been retracted by deactuation of their associated solenoids, which are not numbered in FIG. 2, with the result that second and third pushers 30, 32 have retracted to a position above and out of contact with liquid color supply line 22. As a result, liquid color again fills the portion of liquid color supply line 22 up to the position of first tube closure defined by pusher 28, with the liquid color coming from the supply in the direction indicated by Arrow A in FIG. 4F. From this position the pumping cycle may repeat. Note that the orientation and positions of first, second and third pushers 28, 32, 30 is identical in FIGS. 4F and 4B.

During operation of the liquid color gravimetric metering apparatus, controller 18 continuously monitors the weight of container 14 and any liquid color contained therein. Controller 18 detects steady loss of weight by container 14 and compares the actual weight readings with expected weight readings that have been programmed into controller 18 based on a requested usage rate of liquid color for a given recipe of resin material being processed into finished parts. Controller 18 then adjusts the speed of pump 16 accordingly, by adjusting the rate of performance of the sequential operation of pushers 28, 32, 30 as described above, so that the desired amount of liquid color is always supplied by pump 16 at the rate needed for a given material recipe. Hence, pump 16 is controlled to run faster or slower in order to maintain the desired rate of liquid color use, based on feedback information as to loss of weight of container 14 as detected by scale 12.

The invention claimed is:

1. A method for delivering liquid color directly into the screw barrel of a plastic resin process machine, comprising:
   a) weighing a container of liquid color;
   b) pumping liquid color from the container into the plastic resin process machine screw barrel; and
   c) continuously comparing actual readings from the scale to expected readings based on a desired predetermined liquid color usage rate and continuously regulating speed of pumping in response to such comparison to supply liquid color directly into the plastic resin process machine screw barrel according to a selected recipe of resin material to produce plastic parts having desired color characteristics.

2. The method of claim 1 further comprising continuously weighing the container.

3. The method of claim 1 further comprising supporting the container during weighing.

4. The method of claim 2 further comprising supporting the container during weighing.

* * * * *